US008162647B2

(12) United States Patent
Kim

(10) Patent No.: US 8,162,647 B2
(45) Date of Patent: Apr. 24, 2012

(54) BLOWING AGENT INTRODUCTION SYSTEMS AND METHODS

(75) Inventor: Roland Y. Kim, Andover, MA (US)

(73) Assignee: Trexel, Inc., Wilmington, MA (US)

( * ) Notice: Subject to any disclaimer, the term of this patent is extended or adjusted under 35 U.S.C. 154(b) by 171 days.

(21) Appl. No.: 11/544,295

(22) Filed: Oct. 6, 2006

(65) Prior Publication Data

US 2007/0141188 A1 Jun. 21, 2007

Related U.S. Application Data

(62) Division of application No. 10/281,891, filed on Oct. 28, 2002, now Pat. No. 7,144,532.

(51) Int. Cl.
*B29C 44/44* (2006.01)
*B29C 47/92* (2006.01)

(52) U.S. Cl. ......... 425/145; 425/4 R; 425/149; 425/580; 425/585; 425/586

(58) Field of Classification Search .................. 425/4 R, 425/145, 817 R, 585, 561, 208, 146, 143, 425/144, 149, 557, 559, 560, 562, 567, 579, 425/580, 135, 4 C, 817 C, 131.1, 586; 264/40.1, 264/40.4, 50, 51, 53
See application file for complete search history.

(56) References Cited

U.S. PATENT DOCUMENTS

| 3,686,388 | A | | 8/1972 | Beckmann et al. | |
|---|---|---|---|---|---|
| 3,697,204 | A | * | 10/1972 | Kyritsis et al. | 425/4 R |
| 3,793,416 | A | | 2/1974 | Finkmann et al. | |
| 3,908,862 | A | * | 9/1975 | Chandra et al. | 222/63 |
| 3,909,169 | A | * | 9/1975 | Barrie | 425/130 |
| 3,981,649 | A | * | 9/1976 | Shimano et al. | 425/4 C |
| 4,043,715 | A | * | 8/1977 | Hendry | 425/4 R |
| 4,051,209 | A | * | 9/1977 | Tabler | 264/39 |
| 4,124,336 | A | | 11/1978 | Johnson | |

(Continued)

FOREIGN PATENT DOCUMENTS

EP 0 486 957 A1 5/1992

(Continued)

OTHER PUBLICATIONS

International Search Report for PCT/US03/34216 mailed on May 21, 2004.

(Continued)

*Primary Examiner* — Joseph Del Sole
*Assistant Examiner* — Seyed Masoud Malekzadeh
(74) *Attorney, Agent, or Firm* — Wolf, Greenfield & Sacks, P.C.

(57) ABSTRACT

The present invention provides blowing agent introduction systems and methods for introducing blowing agent into polymeric foam processing systems. The methods may involve introducing one or more doses of blowing agent into polymeric material in an extruder during a plastication period of a molding cycle. Prior to introduction, a dose is confined in an accumulator which, for example, has a volume defined between an inlet valve and an outlet valve. A control system may receive inputs related to system parameters (e.g., pressure of polymeric material in extruder, axial position of screw in barrel, whether screw is rotating, and the like) and based on the inputs coordinates operation of the valves to confine and introduce the blowing agent dose(s). The introduction systems may be used in discontinuous plasticating processes, such as injection molding and blow molding, and can be particularly useful in processes that use precise quantities of blowing agent.

15 Claims, 8 Drawing Sheets

U.S. PATENT DOCUMENTS

| | | | |
|---|---|---|---|
| 4,211,523 A * | 7/1980 | Hunerberg | 425/4 C |
| 4,255,367 A * | 3/1981 | Wallace et al. | 264/45.1 |
| 4,344,710 A * | 8/1982 | Johnson et al. | 366/76.2 |
| 4,381,272 A | 4/1983 | Ehritt | |
| 4,422,988 A * | 12/1983 | Kornylak | 264/40.3 |
| 4,424,287 A * | 1/1984 | Johnson et al. | 521/74 |
| 4,470,938 A | 9/1984 | Johnson | |
| 4,473,665 A * | 9/1984 | Martini-Vvedensky et al. | 521/79 |
| 4,613,471 A | 9/1986 | Harris | |
| 4,734,025 A * | 3/1988 | Kawamura et al. | 425/145 |
| 4,783,292 A | 11/1988 | Rogers | |
| 4,800,050 A * | 1/1989 | Hahn et al. | 264/40.6 |
| 4,984,977 A * | 1/1991 | Grimminger et al. | 425/145 |
| 5,047,183 A | 9/1991 | Eckardt et al. | |
| 5,062,053 A * | 10/1991 | Shirai et al. | 700/200 |
| 5,098,267 A | 3/1992 | Cheng | |
| 5,120,559 A | 6/1992 | Rizvi et al. | |
| 5,154,088 A | 10/1992 | Lehnert et al. | |
| 5,158,986 A | 10/1992 | Cha et al. | |
| 5,160,674 A | 11/1992 | Colton et al. | |
| 5,229,952 A * | 7/1993 | Galloway et al. | 700/200 |
| 5,328,651 A | 7/1994 | Gallagher et al. | |
| 5,334,356 A | 8/1994 | Baldwin et al. | |
| 5,354,525 A * | 10/1994 | Fujimoto et al. | 264/40.5 |
| 5,382,603 A | 1/1995 | Krippl et al. | |
| 5,389,315 A * | 2/1995 | Yabushita | 264/40.1 |
| 5,441,680 A * | 8/1995 | Guergov | 264/40.1 |
| 5,513,971 A * | 5/1996 | Nakamura et al. | 425/145 |
| 5,723,152 A * | 3/1998 | Hirata et al. | 425/4 R |
| 5,747,076 A * | 5/1998 | Jaroschek et al. | 425/145 |
| 5,827,549 A * | 10/1998 | Rancich et al. | 425/145 |
| 5,866,053 A * | 2/1999 | Park et al. | 264/50 |
| 5,885,624 A * | 3/1999 | Katsuta et al. | 425/149 |
| 6,005,013 A | 12/1999 | Suh et al. | |
| 6,036,899 A * | 3/2000 | Iwai et al. | 264/51 |
| 6,051,174 A | 4/2000 | Park et al. | |
| 6,169,122 B1 | 1/2001 | Blizard et al. | |
| 6,231,942 B1 | 5/2001 | Blizard et al. | |
| 6,235,380 B1 | 5/2001 | Tupil et al. | |
| 6,284,810 B1 | 9/2001 | Burnham et al. | |
| 6,287,494 B1 | 9/2001 | Clarke | |
| 6,322,347 B1 | 11/2001 | Xu | |
| 6,328,916 B1 * | 12/2001 | Nishikawa et al. | 264/53 |
| 6,376,059 B1 | 4/2002 | Anderson et al. | |
| 6,391,931 B1 | 5/2002 | Gehlsen et al. | |
| 6,451,230 B1 * | 9/2002 | Eckardt et al. | 264/40.3 |
| 6,538,040 B1 * | 3/2003 | Okuda et al. | 516/10 |
| 6,593,384 B2 * | 7/2003 | Anderson et al. | 521/97 |
| 6,602,063 B1 | 8/2003 | Cardona | |
| 6,616,434 B1 | 9/2003 | Burnham et al. | |
| 6,706,223 B1 * | 3/2004 | Anderson et al. | 264/51 |
| 6,790,020 B2 * | 9/2004 | Kitayama et al. | 425/4 R |
| 6,884,823 B1 * | 4/2005 | Pierick et al. | 521/79 |
| 6,926,507 B2 | 8/2005 | Cardona et al. | |
| 7,144,532 B2 | 12/2006 | Kim | |
| 2001/0011782 A1 * | 8/2001 | Ide et al. | 264/148 |
| 2001/0033040 A1 * | 10/2001 | Cardona et al. | 264/51 |
| 2003/0080452 A1 * | 5/2003 | Bulgrin et al. | 264/40.1 |
| 2004/0038018 A1 * | 2/2004 | Anderson et al. | 428/304.4 |

FOREIGN PATENT DOCUMENTS

| | | |
|---|---|---|
| EP | 0 574 051 A1 | 12/1993 |
| EP | 0 843 246 A2 | 11/1997 |
| EP | 0 615 830 B1 | 12/1997 |
| EP | 0 972 626 A2 | 1/2000 |
| JP | 2001-150485 | 5/2001 |
| KR | 2000-0032383 | 6/2000 |
| WO | WO 98/08667 A3 | 3/1998 |
| WO | WO 98/31521 A2 | 7/1998 |
| WO | WO 01/66331 A1 | 9/2001 |
| WO | WO 02/14044 A1 | 2/2002 |

OTHER PUBLICATIONS

Translation of an office action from Japanese application Serial No. 2004-548541, Year: 2004.

* cited by examiner

BLOWING AGENT INTRODUCTION SYSTEMS AND METHODS

RELATED APPLICATIONS

This application is a divisional of U.S. patent application Ser. No. 10/281,891, filed on Oct. 28, 2002 now issued as U.S. Pat. No. 7,144,532 on Dec. 5, 2006 which is incorporated herein by reference.

BACKGROUND

1. Field of the Invention

The present invention relates generally to polymer foam processing and, more particularly, to systems and methods for introducing blowing agent into polymeric material in a polymeric foam process.

2. Description of the Related Art

Polymeric materials are processed using a variety of techniques. Many techniques employ an extruder which includes a polymer processing screw that rotates within a barrel to plasticate polymeric material. Some processing techniques, such as injection molding and blow molding, may be discontinuous. That is, during operation, the screw does not plasticate polymeric material continuously. Discontinuous processes may have repetitive cycles which include a plastication period, in which the screw rotates and polymeric material is accumulated, followed by an injection (or ejection) period, in which the screw does not rotate and the accumulated polymeric material is injected into a mold (or ejected through a die).

Polymeric foam materials, including microcellular materials, may be processed by introducing a physical blowing agent into the polymeric material within the extruder through a blowing agent port in the barrel. Many conventional blowing agent introduction systems introduce blowing agents continuously into the polymeric material within the barrel. In discontinuous processes, including certain injection molding and blow molding processes, such continuous introduction systems may cause a lack of control over the percentage of blowing agent injected into the polymeric material and may lead to an uneven distribution of the blowing agent in the polymeric material. In particular, the polymeric material in the vicinity of the blowing agent port, when the screw ceases to plasticate polymeric material, may contain higher amounts of blowing agent because of its increased residence time in proximity to the blowing agent injection port. The uneven distribution of blowing agent may result in viscosity variations within the polymeric material in the extruder which can cause output inconsistencies and other problems. Such effects may generally reduce control over the process and may narrow the processing window.

In some polymer processes, including some discontinuous processes, such conventional blowing agent introduction systems may be adequate. However, in other processes, such as discontinuous processes that require relatively precise control over blowing agent introduction, the conventional introduction systems may impair the process for one or more of the reasons described above. In particular, certain processes for producing small molded articles and/or microcellular foam articles may be adversely affected if the blowing agent is not precisely controlled.

SUMMARY OF THE INVENTION

The invention provides blowing agent introduction systems, methods for introducing blowing agent into a polymeric foam processing system, and polymer processing systems that include blowing agent introduction systems.

In one aspect, the invention includes a blowing agent introduction system. In one set of embodiments, the blowing agent introduction system includes an accumulator having an inlet connectable to a source of blowing agent and an outlet connectable to a blowing agent port of an extruder. The system further includes a pressure regulating device positioned between the source of blowing agent and the inlet of the accumulator. The pressure regulating device is designed to control the pressure of blowing agent delivered to the accumulator. The system further includes a pressure measuring device constructed and arranged to measure pressure of polymeric material in the extruder. The system further includes a control system capable of receiving a first input signal from the pressure measuring device representative of the pressure of polymeric material in the extruder and sending a first output signal to the pressure regulating device to control the pressure of blowing agent delivered to the accumulator to a value greater than the pressure of polymeric material in the extruder.

In another set of embodiments, the invention includes a blowing agent introduction system. The system includes an accumulator having an inlet connectable to a source of blowing agent and an outlet connectable to a blowing agent port of an extruder. The system further includes a pressure regulating device positioned between the source of blowing agent and the inlet of the accumulator. The pressure regulating device is designed to control the pressure of blowing agent delivered to the accumulator. The system further includes an outlet valve associated with the outlet of the accumulator, and a pressure measuring device constructed and arranged to measure pressure of polymeric material in the extruder. The system further includes a control system capable of receiving a first input signal from the pressure measuring device representative of the pressure of polymeric material in the extruder and sending a first output signal to open the outlet valve when the pressure of blowing agent delivered to the accumulator is greater than the pressure of polymeric material in the extruder.

The invention includes a blowing agent introduction system in another set of embodiments. The system includes an accumulator having a substantially fixed volume, an inlet connectable to a source of blowing agent and an outlet connectable to a blowing agent port of an extruder. The system further includes a control system capable of adjusting pressure of blowing agent in the accumulator in response to pressure of polymeric material in the extruder.

In another aspect, the invention provides a system. The system includes an extruder including a screw designed to rotate within a barrel to plasticate polymeric material during a plastication period of a molding cycle. The extruder has a blowing agent port. The system further includes an accumulator having an inlet connectable to a source of blowing agent and an outlet connectable to the blowing agent port. The system further includes an outlet valve associated with the outlet of the accumulator, and a control system capable of receiving an input signal representative of the start of the plastication period and sending an output signal to open the outlet valve.

In another aspect, the invention includes a method. In one set of embodiments, the method includes the steps of plasticating polymeric material in an extruder, introducing a first dose of blowing agent into the polymeric material while plasticating the polymeric material in a first plastication period of a molding cycle, introducing a second dose of blowing agent into the polymeric material while plasticating the polymeric material in the first plastication period of the molding cycle, and injecting a mixture of blowing agent and polymeric material into a mold.

In another set of embodiments, the invention includes a method of introducing blowing agent into polymeric material. The method includes the steps of plasticating polymeric material in an extruder, and sequentially introducing blowing agent into the polymeric material during a plastication period of a first molding cycle at a first rate, a second rate, and a third rate. The second rate has a minimum value that is less than 50% of the smaller of the maximum values of the first and third rates.

In another set of embodiments, the invention includes a method of introducing blowing agent into polymeric material. The method includes the steps of measuring pressure of polymeric material in an extruder and controlling pressure of blowing agent in an accumulator to a value between about 50 psi and about 1000 psi greater than the pressure of polymeric material in the extruder. The method further includes introducing blowing agent from the accumulator into the polymeric material in the extruder.

Other advantages, novel features, and objects of the invention will become apparent from the following detailed description of non-limiting embodiments of the invention when considered in conjunction with the accompanying drawings, which are schematic and which are not intended to be drawn to scale. In the figures, each identical or nearly identical component that is illustrated in various figures typically is represented by a single numeral. For purposes of clarity, not every component is labeled in every figure, nor is every component of each embodiment of the invention shown where illustration is not necessary to allow those of ordinary skill in the art to understand the invention. In cases where the present specification and a document incorporated by reference include conflicting disclosure, the present specification shall control.

BRIEF DESCRIPTION OF THE DRAWINGS

Non-limiting embodiments of the present invention will be described by way of example with reference to the accompanying drawings in which.

DETAILED DESCRIPTION

The present invention provides blowing agent introduction systems and methods for introducing blowing agent into polymeric foam processing systems. The methods may involve introducing one or more doses of blowing agent into polymeric material in an extruder during a plastication period of a molding cycle. Prior to introduction, a dose is confined in an accumulator which, for example, has a volume defined between an inlet valve and an outlet valve. As described further below, a control system may receive inputs related to system parameters (e.g., pressure of polymeric material in extruder, axial position of screw in barrel, whether screw is rotating, and the like) and based on the inputs coordinates operation of the valves to confine and introduce the blowing agent dose(s). The introduction systems may be used in discontinuous plasticating processes, such as injection molding and blow molding, and can be particularly useful in processes that use precise quantities of blowing agent.

Figure 1:
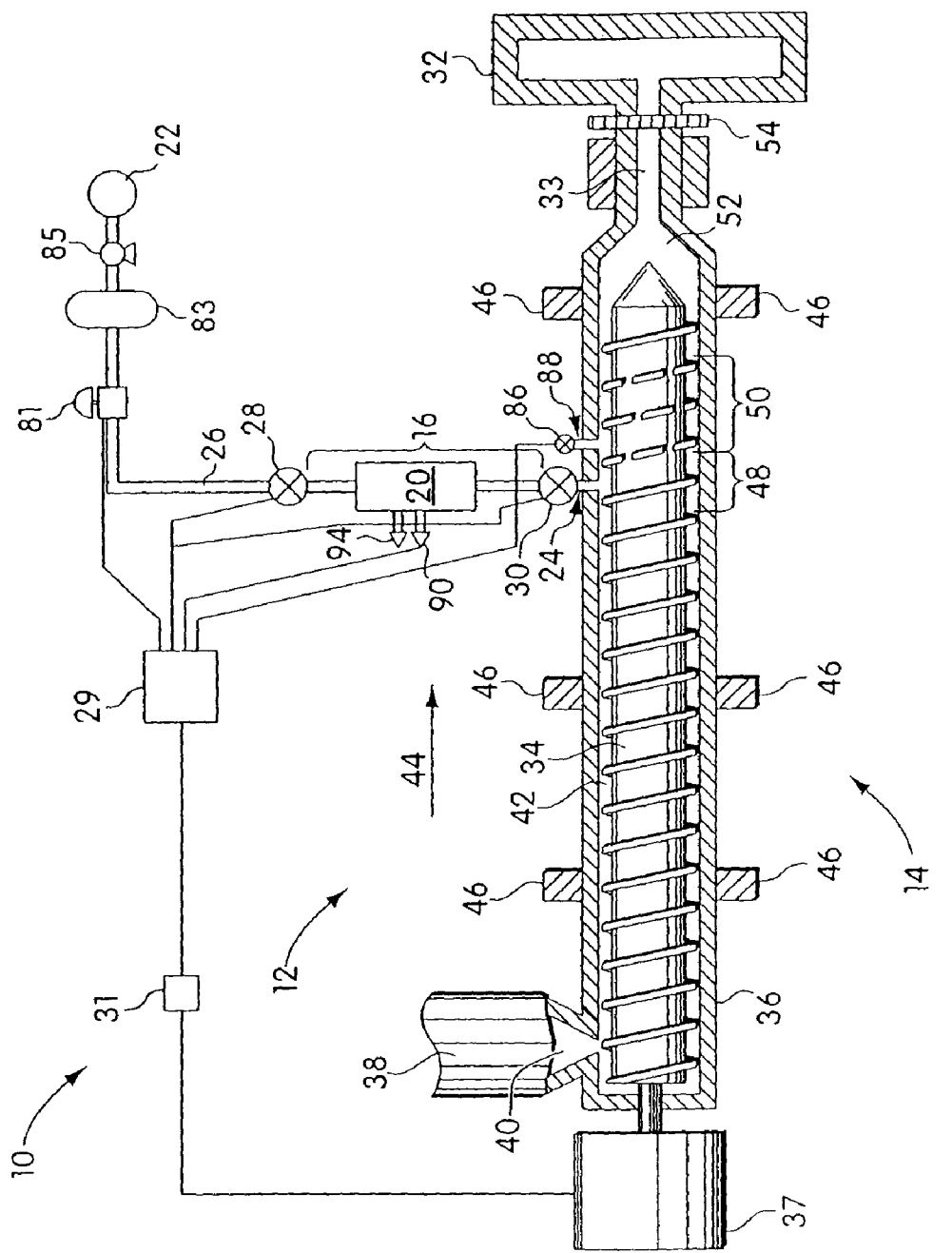
FIG. 1 schematically illustrates a blowing agent introduction system used to introduce blowing agent into an extruder of an injection molding system.

Referring to FIG. 1, one illustrative embodiment of a blowing agent introduction system 10 according to the invention is shown connected to an extruder 12 of an injection molding system 14. Introduction system 10 introduces blowing agent from a source 22 through a blowing agent port 24 into polymeric material in extruder 12. Conduit 26 connects the blowing agent source to various components of the introduction system and to the blowing agent port. Downstream of source 22, the introduction system includes a pump 85 to increase the pressure of blowing agent, a high pressure tank 83 to store blowing agent, and a pressure regulating device (e.g., a pressure reducing regulator 81) to regulate blowing agent downstream of the device to a fixed value. The introduction system also includes an accumulator 16 having a volume defined between an inlet valve 28 and an outlet valve 30. In the embodiment of FIG. 1, the accumulator includes a chamber 20 which defines the majority of the volume of the accumulator. In other embodiments, the chamber may not define the majority of the accumulator volume. Inlet valve 28 is positioned between the blowing agent source and the accumulator to permit/prevent the flow of blowing agent into the accumulator and outlet valve 30 is positioned between the accumulator and the blowing agent port to control the flow of blowing agent to the blowing agent port. In some cases and as shown, it may be preferable to position the outlet valve proximate to port 24. A control system 29 which, as described further below, may receive input signals from an injection molding controller 31 and/or introduction system 10 and send output signals to open and close valves 28, 30, thus, controlling the operation of the introduction system. In systems that do not include an injection molding controller 31, the control system 29 may receive inputs from components of the injection molding system.

Figure 2:
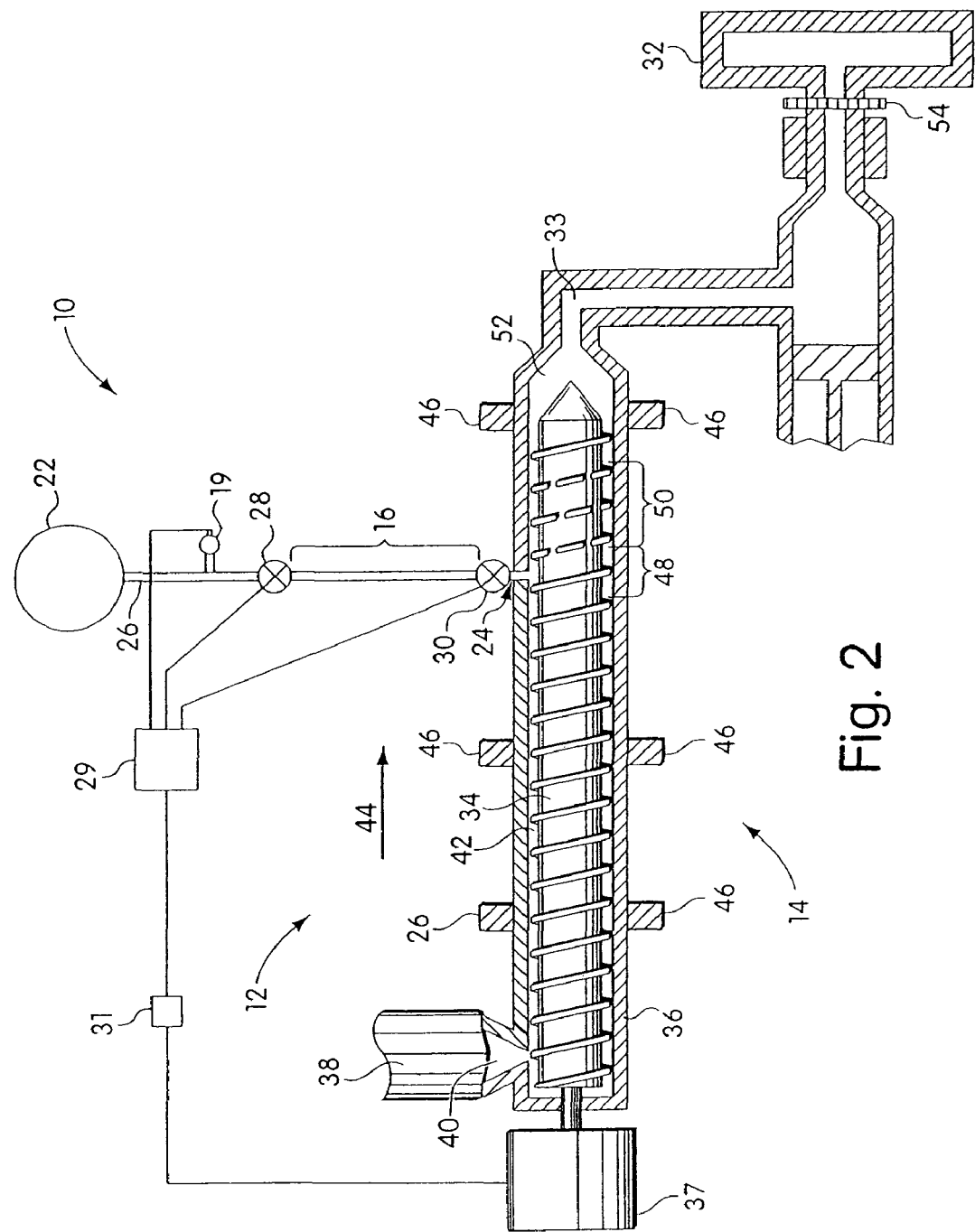
FIG. 2 schematically illustrates another blowing agent introduction system used to introduce blowing agent into an extruder of an injection molding system.

It should be understood that the introduction system may have a variety of different configurations in other embodiments of the present invention. For example, as shown in FIG. 2 and described further below, the accumulator may not include a chamber. Also, in certain embodiments, the introduction system may not include certain components such as a pump or a high pressure tank. In some embodiments, the pressure regulating device may be a back pressure regulator as shown in FIG. 2 and described further below.

Injection molding system 14 may be any suitable type known in the art. Examples of suitable injection molding systems have been described, for example, in International Publication No. WO 98/31521, entitled "Injection Molding of Microcellular Material," by Pierick et. al. which is incorporated herein by reference. In the illustrative embodiment of FIG. 1, the injection molding system includes extruder 12 having an outlet 33 fluidly connected to an injection mold 32. The extruder includes a polymer processing screw 34 that is mounted within barrel 36. Polymer processing screw may be rotated and moved axially in a downstream direction, for example, by a motor 37. Polymeric material, typically in pelletized form, is fed into barrel 36 from a hopper 38 through an orifice 40. Screw 34 and barrel 36 define therebetween a polymer processing space 42 in which polymeric material is conveyed in a downstream direction 44 during the plastication period of the cycle by the rotation of the screw. Blowing agent port 24 is formed in the barrel to permit introducing of blowing agent into the polymeric material in the polymer processing space. Barrel 36 may be equipped with temperature control units 46 at selective positions along its axial length. Temperature control units 46 may be used to heat the barrel, for example to facilitate melting of pelletized polymeric material, or cool the barrel, for example to increase the viscosity of the polymeric melt. Extruder 12 may also include measurement instruments (not shown) such as thermocouples and pressure transducers to monitor, respectively, the temperature and pressure of the polymeric material at various locations along the length of the barrel.

The operation of the blowing agent introduction system may be coupled to the plasticating period of the molding cycle. At the beginning of a molding cycle, screw 34 is positioned at a downstream end of barrel 36 as shown in FIG. 1 and, typically, a quantity (or "dose") of blowing agent is confined at a relatively high pressure in accumulator 16. Screw 34 begins to rotate within barrel 36 to plasticate polymeric material and convey the polymeric material in a downstream direction in the polymer processing space. At the start of, or at any point during plastication, outlet valve 30 may be opened by control system 29. The control system, for example, may open the outlet valve in response to a specified condition as described further below. For example, the control system may open the outlet valve when blowing agent pressure in the accumulator is greater than the pressure of polymeric material in the extruder. When the outlet valve is opened, the blowing agent in the accumulator expands, thus, passing through the blowing agent port and entering the polymeric material to form a mixture of polymeric material and blowing agent in the polymer processing space.

After the dose is introduced, the outlet valve is closed. Typically, the inlet valve is then opened, for example by a signal from the control system, which allows blowing agent to flow into the accumulator. The inlet valve may then be closed to confine a dose of blowing agent in the accumulator between the closed inlet and outlet valves. In some processes, as described further below, multiple blowing agent doses may be introduced during a single plastication period.

After the dose is introduced, the polymeric material and blowing agent mixture is conveyed downstream by the rotating screw and accumulated in a region 52 within the barrel downstream of the screw. The accumulated mixture creates a pressure that causes the screw to retract axially in an upstream direction in the barrel. Typically, plastication continues until a desired quantity of mixture (or shot) is accumulated. In some embodiments, as described further below, the amount of blowing agent introduced during a plastication period may be controlled to create a shot having the desired weight percentage of blowing agent. For example, the amount of blowing agent may be controlled by introducing multiple blowing agent doses in a single plastication period or controlling the dose size (e.g., by accumulator volume and/or pressure of blowing agent in accumulator and/or temperature of blowing agent in the accumulator).

After a shot has been accumulated in region 52, screw 34 ceases to rotate and to retract. Then, screw 34 is moved axially in a downstream direction (indicated by 44 in FIG. 1) to inject the accumulated shot through outlet 33 of the extruder and into the mold. A valve 54 associated with the outlet of the extruder may be opened to permit the mixture to flow into the mold. The mixture of polymeric material and blowing agent is cooled in the mold, after which the mold is opened to produce an injection molded foam article.

As noted above, control system 29 may receive input signals from components of the molding system and/or send output signals to open and/or close valves 28, 30 and to control the operation of other components (e.g., pressure regulating device 81) of the introduction system.

In some process, control system 29 receives input signals from a temperature measuring device 94 positioned within accumulator 20. As described further below, the controller may determine the mass of blowing agent confined in the accumulator (i.e., dose size) from the blowing agent temperature and other inputs (e.g., blowing agent pressure). The temperature measuring device as shown is positioned within chamber 20, although it should be understood that it may be positioned elsewhere in the accumulator.

In some embodiments, the control system receives an input signal from a pressure measuring device 86 related to the pressure of polymeric material in the polymer processing space in the vicinity of the blowing agent port. In the embodiment of FIG. 1, pressure measuring device 86 is inserted through an instrument port 88 formed in the barrel proximate the blowing agent port. For example, instrument port 88 may be positioned within about 12 inches, within about 5 inches, or within about 1 inch from blowing agent port 24. In other embodiments, the pressure measuring device may indirectly measure the pressure of polymeric material in the vicinity of the blowing agent port, for example, by measuring or determining a pressure elsewhere in the system (e.g., hydraulic pressure at back of the screw) and inferring or calculating the pressure of the polymeric material.

In some cases, the control system may send an output signal to a component of the introduction system to control the pressure of blowing agent in accumulator 16. For example, the control system may send an output signal that controls the pressure of blowing agent in the accumulator in response to the input signal from pressure measuring device 86. The pressure of blowing agent in the accumulator may be adjusted to a desired value by sending an output signal, for example, to a pressure regulating device (e.g., pressure reducing regulator 81, FIG. 1; back pressure regulator 19, FIG. 2). The pressure regulating device, in turn, fixes the pressure of blowing agent delivered to the accumulator when inlet valve 28 is opened. In other cases, the pressure of blowing agent in the accumulator may be adjusted by sending an output signal to other components capable of fixing the pressure delivered to the accumulator.

The control system can set the pressure of the blowing agent supplied to the accumulator at a value greater than the pressure of polymeric material in the extruder in the vicinity of the blowing agent port. Typically, the control system sets the blowing agent pressure greater than the polymeric material pressure by at least a critical amount. The amount is selected so as to ensure there is sufficient driving force to introduce the dose of blowing agent and to maintain blowing agent pressure greater than the polymeric material pressure throughout introduction even when the polymeric material pressure fluctuates in the extruder. In some cases, the control system may send an output signal that sets the blowing agent pressure in the accumulator at least 50 psi greater than the polymeric material pressure in the vicinity of the blowing agent port. In other cases, the control system may send an output signal that sets the blowing agent pressure in the accumulator at least 200 psi, or even at least 400 psi, greater than the polymeric material pressure in vicinity of the blowing agent port. Higher pressure differences may be desirable in certain processes such as those that are characterized by having relatively high pressure fluctuations in the extruder. Higher pressure differences may also increase the rate of blowing agent introduction.

In some embodiments, the control system sets the pressure of the blowing agent supplied to the accumulator greater than the pressure of polymeric material in the extruder but less than a critical amount. If the pressure difference between the pressure of blowing agent in the accumulator and the pressure of polymeric material in the extruder is too great than the molding process may be negatively effected. For example, if the pressure difference is too high than the blowing agent may not be properly mixed in the extruder which can effect the quality of molded parts. Furthermore, if the pressure difference is too high than blowing agent may cause backflow in the extruder. These effects may impair process stability. In some processes, the control system may send an output signal that sets the blowing agent pressure in the accumulator greater than the polymeric material pressure in the vicinity of the blowing agent port by a value less than 1000 psi greater than the polymeric material pressure. In other processes, the control system sets the blowing agent pressure in the accumulator greater than the polymeric material pressure in the vicinity of the blowing agent port by a value less than 500 psi greater than the polymeric material pressure. The specific pressure difference may depend on the process. For example, some processes may be more sensitive to higher pressure differences.

It should be understood that in certain processes, the controller sets the blowing agent pressure in the accumulator greater than the polymeric material pressure within a critical range. The lower limit of the range may be any of the values disclosed above (e.g., 50 psi, 200 psi, and 400 psi) and the upper limit of the range may be any of the values disclosed above (e.g., 500 psi or 1000 psi). For example, the controller may set the blowing agent pressure in the accumulator between 50 psi and 1000 psi greater than the pressure in the polymeric material in the extruder in the vicinity of the blowing agent port. In other cases, the controller sets the blowing agent pressure in the accumulator between 50 psi and 500 psi greater than the pressure of the polymeric material in the extruder in the vicinity of the blowing agent port.

It should also be understood, however, that in some embodiments of the invention the control system does not need to send an output signal to a component of the introduction system to control the pressure of blowing agent in the accumulator. In some embodiments, a user may manually set the pressure delivered to the accumulator, for example, by manually setting the pressure regulator. In other embodiments, the blowing agent may be provided to the accumulator (e.g., by source 22) at a sufficient pressure without the need for adjustment.

Once the desired pressure value of blowing agent in the accumulator is achieved, the control system may send an output signal that opens outlet valve 30 to introduce blowing agent into the polymeric material. In some cases, the introduction system includes a pressure measuring device 90 to confirm when the blowing agent pressure in the accumulator has reached its desired value. In these cases, pressure measuring device 90 may send input signals to the control system. In response to these input signals, the control system sends an output signal to open the outlet valve when the appropriate pressure condition has been achieved.

However, it should be understood that in some embodiments, the introduction system may not include a device that measures pressure in the accumulator. In these embodiments, the pressure in the accumulator is assumed to be a certain value, for example, the value set by the pressure regulating device. Elimination of pressure measuring device 90 may advantageously simplify the design of the introduction system in certain cases.

When pressure measuring device 90 is present, the device may be inserted via an instrument port in chamber 20 of the accumulator. It should also be understood that the pressure measuring device 90 may be inserted into other regions (e.g., conduit 26) of the accumulator. In other embodiments, pressure measuring device 90 may indirectly measure the pressure of the blowing agent port, for example, by measuring or determining a pressure elsewhere in the system and inferring or calculating the pressure of the blowing agent.

In another set of embodiments, control system 29 may send an output signal to open the outlet valve in response to an input signal from injection molding controller 31 (or from components of the injection molding system) related to the onset of the plastication period of the molding cycle (e.g., based on axial position of the screw or time after onset of screw rotation) instead of in response to an input signal related to the pressure of polymeric material as described above. Thus, these processes may not require direct measurement of the polymeric material pressure. It should be understood that, in some processes, the control system 29 may receive input signals from the injection molding controller 31 related to the onset of the plastication period and receive input signals related to the pressure of polymeric material in the extruder.

In some embodiments when the control system receives an input signal related to the onset of the plastication period, the control system receives an input signal related to the axial position of the screw within the barrel, for example, as the screw retracts during plastication. The control system may, in turn, send an output signal that opens the outlet valve when the screw retracts to a given axial position in the barrel. The retraction distance prior to the outlet valve opening is generally long enough to ensure that the pressure in the extruder has relatively stabilized. In some cases, the control system sends an output signal that opens the valve when the screw has retracted at least 0.5 inches from its original position. In other cases, the control system sends an output signal that opens the valve when the screw has retracted at least 0.1 inches. It should be understood that the screw retraction distance at which the output signal is sent depends on a variety of factors (e.g., total retraction distance throughout cycle) and other retraction distances may be suitable.

In other embodiments, the control system receives an input signal related to the onset of screw rotation. The control system may, in turn, send an output signal that opens the outlet valve when the screw begins to rotate or, more typically, a specified time period thereafter. The specified time period is generally long enough to ensure that pressure in the extruder has relatively stabilized. In some cases, the control system sends an output signal that opens the valve at least 0.5 seconds, or at least 1.0 seconds, after the onset of screw rotation. Other times are also suitable.

The control system may also send an output signal to close outlet valve 30. The outlet valve is typically closed after the dose of blowing agent has been introduced into the polymeric material. That is, the outlet valve is typically closed after blowing agent pressure in the accumulator has decreased to approximately equal the pressure of polymeric material in the extruder. However, it should be understood that in some cases, the outlet valve may be closed prior to the blowing agent pressure becoming approximately equal to the pressure of polymeric material in the extruder.

In certain processes, the control system sends an output signal to close the outlet valve a specified time period after the outlet valve has been open. That is, the control system opens the valve for a specified time period. The specified time period may, for example, be 0.5 seconds or more. In other cases, the specified time period may be 1.0 seconds or more; in other cases, the specified time period may be 5.0 seconds or more. Other specified time periods are also suitable. The specified time period depends on a variety of factors including dose size, number of doses, and plastication period time, amongst others.

It should be understood that in some processes, the control system may send an output signal to close the outlet valve based on other system parameters. For example, the control system may send an output signal to close the outlet valve because of a pressure condition in the extruder or in the accumulator.

The control system also typically controls the operation of inlet valve 28. Generally, the inlet valve is closed when outlet valve 30 is open. When the outlet valve is closed, the control system may send a signal that opens the inlet valve. As described above, in some processes, the control system also sends a signal to regulate or control blowing agent pressure supplied to the accumulator (e.g., by use of a pressure regulating device). In these cases, the inlet valve may be opened after the desired supply pressure is reached. Once the inlet valve is open, blowing agent may flow into the accumulator. Once the desired dose has been accumulated, the inlet valve may be closed by the control system to confine the blowing agent. In some cases, the inlet valve may be left open even after the dose has been accumulated and then closed immediately prior to opening the outlet valve.

As noted above, certain processes may introduce more than one dose of blowing agent during a single plastication period. In one set of embodiments, control system 29 sends multiple open/close signals to valves 28 and 30 during each plastication period, allowing several doses of blowing agent to be delivered. For example, the control system may cause at least 2, 3, 5, 7, 10, 15, or 20 doses of blowing agent to be delivered during a given plastication period. The number of doses introduced during a single plastication period depends on a number of factors including the desired weight percentage of blowing agent in a shot, the shot size, and the dose size. It should be understood that certain processes may utilize a single dose or any other suitable number of doses.

Introducing multiple doses during a given plastication period may be advantageous in certain processes. For example, multiple doses allows for increased control over the total amount of blowing agent introduced into the polymeric material in a given shot. The increased control arises, in part, from using higher accumulator pressures which reduces inaccuracies resulting from polymeric material pressure variations. In addition, higher accumulator pressures result in improved blowing agent introduction into the polymeric material. The increased control enables precise quantities of blowing agent to be introduced in a given shot. This precision, for example, may be important in certain processes that produce shots having relatively small amounts of blowing agent (e.g., less than about 2% of $CO_2$ or less than 0.1% of $N_2$), and/or produce relatively small molded articles (e.g., less than 15 g) and/or produce microcellular foam articles. Introducing multiple doses throughout a plastication period may also increase the uniformity of blowing agent distribution within a shot.

It should be understood that the introduction system and processes of the invention may be used in connection with a wide variety of processes.

The desired blowing agent percentage in a shot depends upon the particular process and the blowing agent type. The desired blowing agent percentage may, for example, be less than about 5% by weight of polymeric material and blowing agent mixture. In embodiments that utilize $CO_2$ as a blowing agent, the level may be less than about 4% and, in others, less than about 2% by weight of polymeric material and blowing agent mixture. When $N_2$ is used as the blowing agent, for example, the level may be less than about 0.5%, less than about 0.3%, or less than about 0.1% by weight of polymeric material and blowing agent mixture. As noted above, the introduction system of the invention may be particularly well suited to forming blowing agent mixtures at low weight percentages of blowing agent.

The shot size also depends upon the particular process and, for example, may be between about 1 g and about 200 g. As noted above, the introduction system may be particularly well suited to introduce blowing agent into relatively small shot sizes, for example, shot sizes of less than 15 g. In some cases, the shot sizes may be between about 1 g and 15 g.

The dose size is typically measured by mass. The dose size is the mass of blowing agent confined in the accumulator that is introduced into the polymeric material. As described above, multiple doses may be introduced in a single plastication cycle. In cases where multiple doses are introduced, the total amount of blowing agent in the shot is the number of doses multiplied by the dose size.

The dose size depends on the particular process, as well as, the volume of the accumulator, and the pressure and temperature of the blowing agent in the accumulator. Typical dose sizes, for example, may be between about 0.005 g and about 0.1 g. In some cases, the dose size may be less than less than 0.1 g; in other cases less than 0.05 g; and, in other cases less than 0.005 g. Smaller dose sizes may be used, for example, for increased precision. It should be understood that other dose sizes are also possible.

In one set of embodiments, control system 29 may control the total amount of blowing agent introduced into a shot and/or the number of blowing agent doses introduced into a shot and/or the size of the dose. The control system may also receive manual inputs of the desired blowing agent percentage in the mixture of polymer and blowing agent and/or the desired dose size and/or the desired shot size. The control system may process the inputs and sends an output signal to control the introduction of blowing agent into the mixture so as to form a mixture having the desired blowing agent percentage.

In some embodiments, as described above, introduction system 10 may utilize control system 29 to receive inputs from pressure measuring device 90 and a temperature measuring device 94 related, respectively, to the pressure and temperature of the blowing agent in the accumulator. The control system may also receive manual inputs related to the selected fixed mass of the blowing agent to be confined in the accumulator; or, alternatively, may calculate the selected mass of the blowing agent to be confined in the accumulator from other inputs. The control system may be programmed to deliver one or more shot sizes, or a desired blowing agent percentage of the blowing agent and polymeric material mixture. Control system 29 may also be configured to calculate the volume and/or mass of blowing agent to be confined in the accumulator using the Ideal Gas law or other phase equilibria relation, from the inputs of blowing agent temperature, blowing agent pressure, and selected mass of the blowing agent.

The volume of accumulator 16 is defined between the inlet valve and the outlet valve. In some cases, the volume of the accumulator may be partially defined within the valve assemblies. The accumulator has a substantially fixed or fixed volume in some embodiments. As used herein, a fixed volume refers to a volume that is constant when blowing agent from the accumulator is introduced into the polymeric material and/or constant during the plastication period of a molding cycle. That is, in these embodiments, the accumulator does not include a wall or plunger assembly that moves when blowing agent is introduced and/or during plastication. Elimination of the movable wall or plunger assembly may be advantageous in certain cases because such designs can complicate construction and operation.

In some embodiments, the accumulator has a volume that is fixed during blowing agent introduction and plastication, but can be adjusted between molding cycles. These types of accumulators also have fixed volumes as defined herein. In one set of embodiments, the accumulator may be adjusted, for example, by adjusting a piston or a screw between cycles that controls the volume of the accumulator, or by replacing the accumulator with another accumulator having a different size.

It should also be understood that, in other embodiments, the accumulator may not have a fixed volume and may utilize movable walls and/or plungers.

The volume of the accumulator depends on the specific process and, in particular, on the desired dose size. In some cases, accumulator 16 may have a volume of less than about 50 cm$^3$. In other cases, the accumulator volume may be less than about 10 cm$^3$, less than about 1 cm$^3$, less than about 0.1 cm$^3$, or less than about 0.01 cm$^3$.

Figure 3:
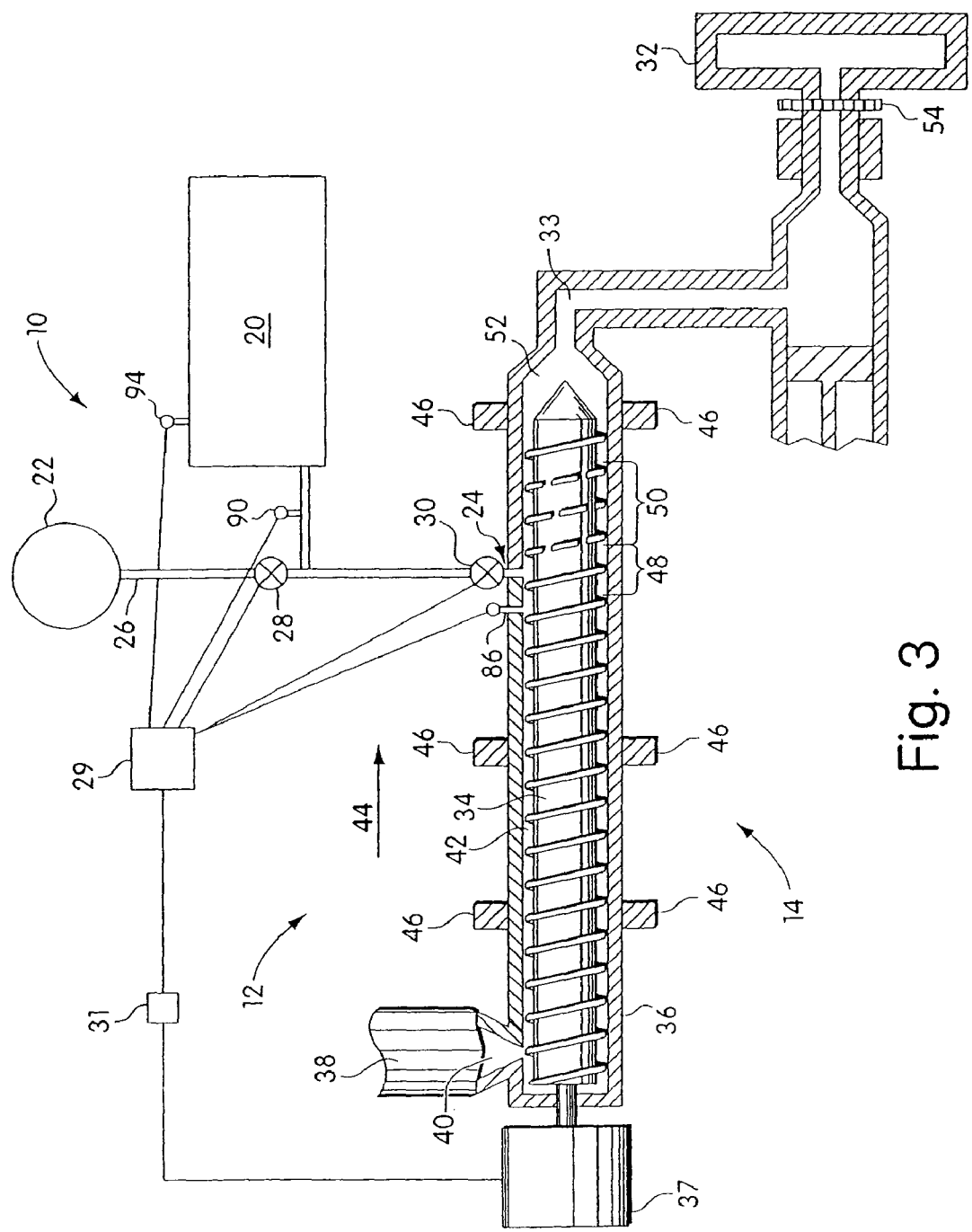
FIG. 3 schematically illustrates another blowing agent introduction system used to introduce blowing agent into an extruder of an injection molding system.

In one set of embodiments, accumulator 16 includes a chamber 20 having a cross-sectional area greater than that of the conduit. The chamber may be in series with the fluidic pathway between valves 28 and 30, as shown in FIG. 1; or, the chamber may have any configuration such that it remains in fluidic communication with valves 28 and 30, as illustrated in FIG. 3. The chamber may have any size or shape necessary for producing a desired volume and containing a pressurized gas or fluid, for example, rectangular, spherical, or cylindrical. The chamber may be any of the kind known in the art able to contain a blowing agent. For example, the chamber may be made of a suitable material for containing a pressurized gas, liquid, and/or supercritical fluid, such as a metal tube, preferably made of stainless steel. The selection of configurations or volumes for the accumulator can be determined by those of ordinary skill in the art with the benefit of the present invention.

In another set of embodiments, accumulator 16 may be defined by conduit existing between valves 28 and valve 30, as illustrated in FIG. 2.

Valves 28, 30 may be any device in the art that selectively permits flow of pressurized gas, liquefied gas, or supercritical fluid therethrough in one configuration, and prevents flow of these fluids therethrough in another configuration. Suitable types of valves include solenoid, spool or other equivalent valves, and they may be shut-off valves. In certain cases, the valve may include a valve body or assembly, which may define at least a portion of the volume of accumulator 16. In some cases, valves 28 and 30 may be the same type, while in other cases the valves may be of different types.

In the illustrative embodiment of FIG. 1, outlet valve 30 is positioned near (e.g., less than 12 inches, less than 3 inches or less than 1 inch) or essentially adjacent to blowing agent port 24. In some cases, this arrangement may be preferred to minimize the volume of blowing agent that may be confined in the conduit between the outlet valve and port 24. However, it is to be understood that the position of the outlet valve may be elsewhere relative to blowing agent port 24 so as to control the flow of blowing agent to the blowing agent port.

Figure 5:
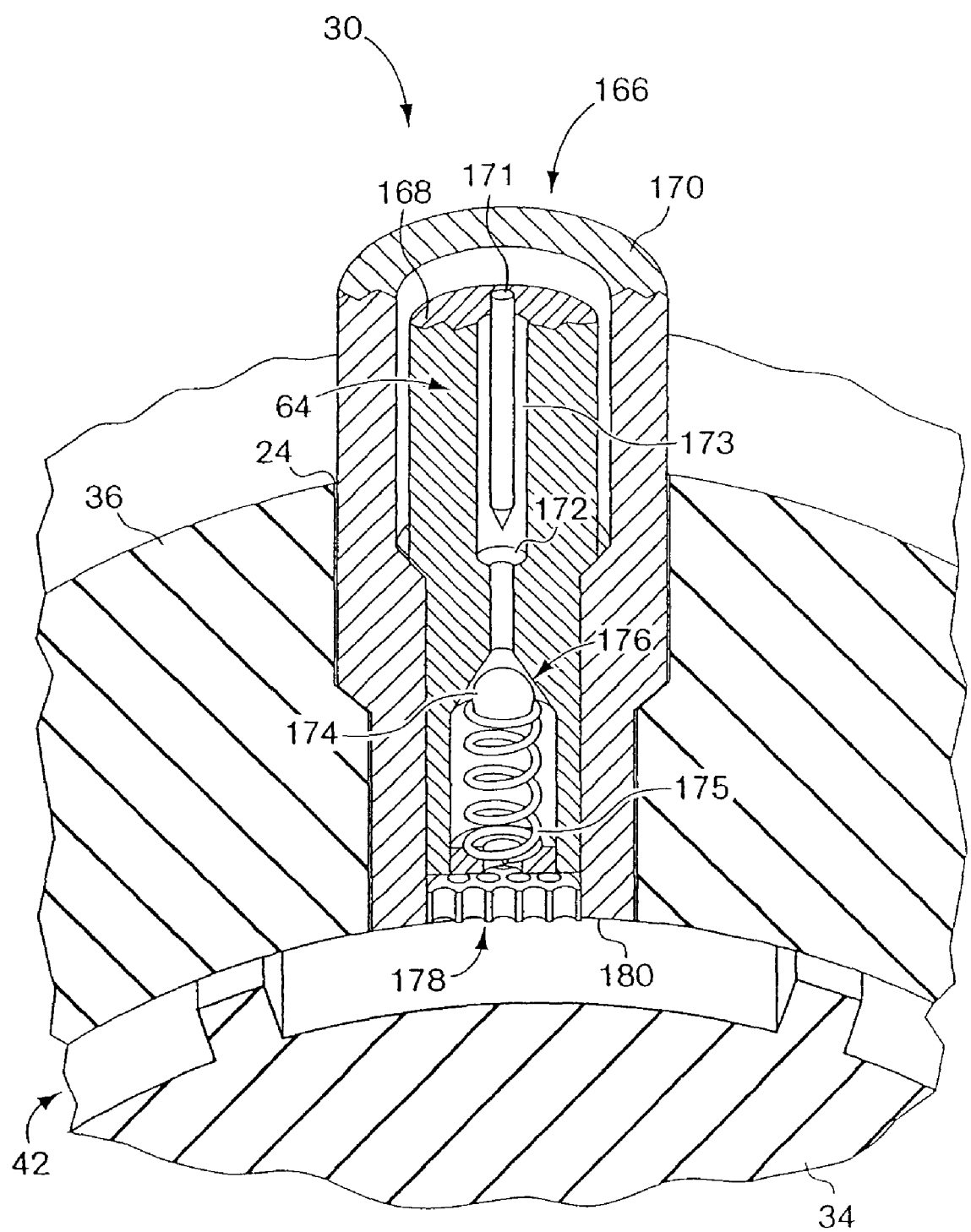
FIG. 5 schematically illustrates a valve assembly of the blowing agent introduction system positioned in an extruder barrel.

When positioned near or adjacent blowing agent port 24, outlet valve 30 may be of the type shown in FIG. 5 and described in commonly owned, co-pending, U.S. patent application Ser. No. 09/710,756, filed Nov. 10, 2000, and entitled "Valve for Injection Molding", and commonly owned, co-pending, U.S. patent application Ser. No. 09/782,673, filed Feb. 13, 2001, and entitled "Blowing Agent Delivery System", the disclosures of which are incorporated herein by reference. FIG. 5 shows outlet valve 30 as part of an injector assembly that is inserted within the blowing agent port, thus, is essentially adjacent to the port. As shown, the outlet valve is formed, in part, from a valve body 168 that is inserted within an injector sleeve 170. The illustrated valve includes a valve stem 171 which is actuatable, for example by compressed air, relative to a valve seat 172 to open or close the valve. In the open position (as shown in FIG. 5), the valve stem is separated from the valve seat to provide a pathway that permits blowing agent to flow through an internal passageway 173 of the valve that is connected to conduit 26 (FIG. 1). In the closed position, the valve stem contacts the valve seat thereby creating a seal that prevents the flow of blowing agent therepast. Valve body 168 also may optionally include a back-flow valve. As illustrated, the back-flow valve includes a ball check 174 which is upwardly biased and held in position by a spring 175, though other valve constructions may also be used. In other embodiments, the spring is not required and the ball may move freely in response to the blowing agent and polymeric material. Typically, when the shut-off valve is open, the pressure of the blowing agent forces the ball check 174 away from a sealing surface 176 to provide a pathway for blowing agent flow to port.

Figure 4:
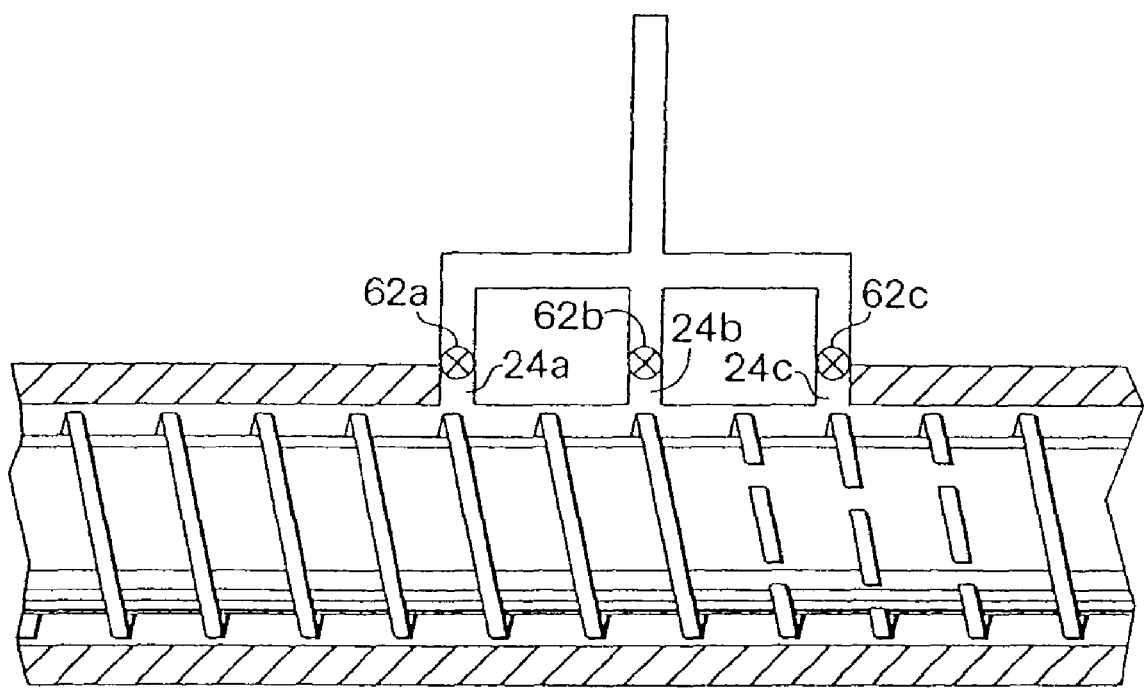
FIG. 4 schematically illustrates a section of an extruder barrel including multiple blowing agent ports connected to a conduit of a blowing agent introduction system.

Blowing agent port 24 is formed in barrel 36 of the extruder at a location where the polymeric material is generally in a fluid state. The blowing agent port connects the blowing agent introduction system to the polymeric material in polymer processing space 42. Blowing agent port 24 may be a single port or a plurality of ports arranged in the barrel. When multiple ports are utilized, ports can be arranged radially about the barrel or in a linear fashion along the length of the barrel (FIG. 4). As shown in FIG. 4, an arrangement of ports 24a, 24b, 24c along the length of the barrel can facilitate injection of blowing agent at a relatively constant location relative to the screw when the screw moves axially (in an upstream direction) within the barrel as the mixture of polymeric material and blowing agent is accumulated. Where radially-arranged ports are used, a plurality of ports 24 may be placed at the 12:00 o'clock, 3:00 o'clock, 6:00 o'clock and 9:00 o'clock positions about the extruder barrel, or in any other configuration as desired.

In FIG. 4, separate shut-off valves 62a, 62b, 62c may be provided at each blowing agent port 24a, 24b, 24c. Shut-off valves 62a, 62b, 62c can be individually opened and closed, during the plastication time period, so as to control injection of blowing agent at desired location relative to the position of the screw, for example, to ensure that blowing agent is introduced at blowing agent injection section of the screw. One or more valves may be opened at the same time. In the illustrative embodiment, each blowing agent port is connected to the same blowing agent introduction system. However, it should be understood that in some embodiments, each blowing agent port may be connected to a single blowing agent introduction system.

Blowing agent port 24 may include a single orifice or a plurality of orifices (178, FIG. 5). In the multi-orifice embodiments, the port may include at least about 2, and some cases at least about 4, and others at least about 10, and others at least about 40, and others at least about 100, and others at least about 300, and others at least about 500, and in still others at least about 700 blowing agent orifices. In another embodiment, port 24 includes an orifice containing a porous material that permits blowing agent to flow therethrough and into the barrel, without the need to machine a plurality of individual orifices.

In certain preferred embodiments, blowing agent port 24 may be located at a blowing agent injection section 48 of the screw during the plastication period of the cycle. The blowing agent injection section of the screw may include full, unbroken flight paths. In this manner, each flight, passes or "wipes" the blowing agent port including orifices periodically, when the screw is rotating. This wiping increases rapid mixing of blowing agent and polymeric material in the extruder the result is a distribution of relatively finely divided, isolated regions of blowing agent in the polymeric material immediately upon injection into the barrel and prior to any mixing. This promotes formation of a uniform polymer and blowing agent mixture which may be desired in certain types of polymeric foam processing including microcellular processing. Downstream of the blowing agent injection section, the screw may include a mixing section 50 which has highly broken flights to further mix the polymer and blowing agent mixture to promote formation of a uniform mixture within the extruder. A preferred uniform mixture, in some cases, is a homogeneous, single-phase solution. In some embodiments when forming microcellular material, as described in International Patent Publication No. WO 98/31521, a homogeneous, single-phase solution of polymeric material and blowing agent is accumulated in region 52 and is nucleated as the charge is injected into the mold.

Source 22 has a larger volume than accumulator 16. The source may supply any type of physical blowing agent known to those of ordinary skill in the art including nitrogen, carbon dioxide, hydrocarbons, chlorofluorocarbons, noble gases and the like, or mixtures thereof. The blowing agent may be supplied to the chamber in any flowable physical state, for example, a gas, liquid, or supercritical fluid. According to one preferred embodiment, source 22 provides carbon dioxide as a blowing agent. In another preferred embodiment, source 22 provides nitrogen as a blowing agent. In certain embodiments, solely carbon dioxide or nitrogen may be supplied by the source. Blowing agents that are in the supercritical fluid state after injection into the extruder (and, optionally, before injection as well), in particular supercritical carbon dioxide and supercritical nitrogen, are especially preferred in certain embodiments.

Conduit 26 may be any of the kind known in the art suitable for transporting a blowing agent. For example, the conduit may be a tube made of a suitable material for transporting pressurized gas, liquid, and/or supercritical fluid, such as a metal tube, preferably made of stainless steel. The conduits also may be defined by passageways within a block of material, such as drilled passageways within a block of metal such as stainless steel. The blowing agent conduits typically have a cross-sectional diameter between about 0.1 mm and about 1.0 cm, though other dimensions are possible. The length and configuration of conduits 26 are not constrained and generally depend upon factors such as available manufacturing space, and the layout of the blowing agent introduction system and injection molding system. In some embodiments, it may be desirable to reduce or minimize the volume of conduits to ensure that excess blowing agent confined within the conduit does not significantly affect the process. The conduit assembly, in some embodiments and as illustrated, may have one or more branches, for example, to facilitate connection to accumulator 16 (FIG. 3) or to provide connection to multiple blowing agent ports (FIG. 4).

Control system 29 and injection molding controller 31 may be any suitable type known in the art. Suitable control systems and controllers have been described, for example, in co-pending, commonly-owned U.S. patent application Ser. No. 09/826,603, entitled "Method and Apparatus for Controlling Foam Molding Processing," which was filed on Apr. 5, 2001 and is incorporated herein by reference. Some systems and processes of the invention do not utilize an injection molding controller.

Pump 85 may be any suitable type known in the art for increasing the pressure of blowing agent supplied from the source.

High pressure tank 83 may also be any suitable type known in the art for storing blowing agent. Tank 83 has a volume that is less than source 22 but greater than the volume of accumulator 16. The high pressure tank is provided to limit the effects of pressure surges into the accumulator when the pump cycles. Typical pressures in the tank may be between about 5,000 psi and 10,000 psi (e.g., about 7,000 psi).

The pressure regulating device may also be any suitable type known in the art for regulating downstream pressure to a fixed value. In some cases and as shown in FIG. 1, the pressure regulating device is a pressure reducing regulator. The pressure at the downstream end of the pressure reducing regulator may be fixed lower than the pressure at the upstream end of the device. For example, the pressure at the upstream end of the device may be about 7,000 psi and the pressure at the downstream end of the device may be reduced to about 4,000 psi. The fixed lower pressure is the pressure of blowing agent delivered to the accumulator.

In other cases, the pressure regulating device may be a back pressure regulator 19 that is positioned within a branch of the conduit as shown in FIG. 2. The back pressure regulator provides a fixed upstream pressure and, for example, may have an outlet vented to the environment. The fixed upstream pressure is the pressure of blowing agent delivered to the accumulator.

As described above, in certain embodiments, the pressure regulating device receives input signals from the control system and, in response, fixes the pressure delivered to the accumulator. In these embodiments, the pressure regulating device must have a suitable design capable of fixing the pressure delivered to the accumulator in response to input signals from the control system.

Though blowing agent introduction system 10 is illustrated in conjunction with an injection molding system, it is to be understood that the blowing agent introduction system according to the invention may be used in conjunction with other polymer processing systems including other discontinuous systems and, in particular, blow molding systems. Examples of suitable blow molding systems have been described, for example, in International Publication No. WO 99/32544 (Anderson et al.) which is incorporated herein by reference.

The blowing agent introduction systems may be used to form a wide variety of molded polymeric material articles and, in particular, molded foam articles. In some embodiments, a molded microcellular article may be formed. Suitable microcellular articles have been described in International Publication No. WO 98/31521 (Pierick et al.) which is incorporated herein by reference above. In some embodiments, the microcellular articles have an average cell size of less than 100 microns, in other embodiments less than 50 microns, in other embodiments less than 25 microns, in other embodiments less than 5 microns, and, in other embodiments, even smaller cell sizes are achievable.

The function and advantage of these and other embodiments of the present invention will be more fully understood from the examples below. The following examples are intended to illustrate the benefits of the present invention, but do not exemplify the full scope of the invention.

Example 1

The example illustrates the use of one embodiment of the invention.

The injection molding machine used was a 55-ton machine having a 20 mm screw. A blowing agent introduction system was connected to the injection molding machine. The blowing agent introduction system included an inlet valve, an outlet valve which was incorporated into a blowing agent injector assembly, and a specific length of conduit to establish the accumulator volume in which the charge or dose of the blowing agent was accumulated prior to introduction into the polymer melt, as described below. The pressure supplied to the accumulator volume was monitored and controlled using a back-pressure regulator on a T-shaped portion of the conduit with an outlet vented to air. The temperature of the tubing was measured using a handheld surface thermocouple device.

The accumulator volume was calculated as the sum of the injector assembly volume, the inlet valve volume downstream of the shut-off valve seat, and the volume of the conduit connecting the valve to the injector. The injector assembly had a volume of 0.18 cm$^3$, the valve had a volume of 0.41 cm$^3$, and the tubing had a volume of 0.069 cm$^3$, for a total volume of 0.659 cm$^3$. The mold in the injection-molding machine was used to produce a test polypropylene part having a solid part weight of 1.6 g.

Using an equation for the density of nitrogen as a function of temperature and pressure, the nitrogen mass in the control volume introduced into the polymer melt was calculated based on the initial pressure in the accumulator volume, and the ending pressure within the accumulator volume. The initial pressure was a pre-set value controlled by the back pressure regulator to be greater than the ending pressure. The apparatus did not include a pressure transducer within the control volume, so it was assumed that the ending pressure within the control volume was substantially the same as that of the pressure of the molten polymer. The polymer melt pressure was monitored using a pressure transducer located in the molten polymer, adjacent to the injector valve outlet.

To introduce the dose of nitrogen, the shut-off valve downstream of the accumulator was opened for one second. A single dose of nitrogen was introduced during the plastication period. The shut-off valve upstream of the accumulator was opened with a time delay of 0.5 seconds after the shut-off valve downstream of the accumulator was closed to confine an additional dose of nitrogen.

The process parameters during plastication are shown below.

| | |
|---|---|
| Circumferential Screw Speed | 4 in/sec |
| Specific back pressure on screw | 1500 psi |
| Polymer dosage volume | 0.15 in$^3$ |
| Inlet Valve Closing Volumetric Position | 0.03 in$^3$ |
| Average Temperature of Accumulator Volumes: | 250 F. |

The polymer melt pressure at the location for nitrogen injection was measured to be 2310 psi to 2360 psi during screw recovery. The nitrogen pressure in the control volume was set to 2550 psi. The calculated dose of nitrogen was 6 mg, using a dosage of 0.375% per 1.6 g of plastic weight.

The process was repeated for one hour with no changes to any process setting. Approximately 120 foam parts were produced. The parts throughout the process had similar characteristics. The consistency of the test parts illustrate the stability of the process, and the ability to dose small amounts of nitrogen consistently using one embodiment of the invention.

Example 2

This is an example of an embodiment of the invention using a lower dosing rate of blowing agent.

Process parameters in the apparatus in this example were the same as that of Example 1, but the nitrogen pressure in the accumulator volume was set to 2475 psi with a polymer melt pressure of 2350 psi. The calculated amount of nitrogen delivered was approximately 3.8 mg, and the temperature was about 250° F. The system parameters were not changed during the run, and the parts were consistently produced for approximately two hours.

Example 3

The example illustrates the use of another embodiment of the invention. In particular, this example illustrates the use of the blowing agent introduction system in connection with a process where the total part weight required a small percentage of the stroke of the machine. In this example, the stroke required was about 7% of the total machine capacity. Typical blowing agent introduction systems cannot be easily operated with consistency at less than 15% of the machine stroke capacity.

The injection molding machine used was a 88-ton machine having a 30 mm screw. The injection molding machine was connected to the blowing agent injection assembly described in Example 1.

The mold in the injection-molding machine was used to produce a U-shaped part having a solid part weight of 6.5 g. The mold had two cavities which were connected by a centered, cold sprue. The material used was a glass-filled Nylon 6.

Using an equation for the density of nitrogen as a function of temperature and pressure, the nitrogen mass in the control volume introduced into the polymer melt was calculated based on the initial pressure in the accumulator volume, and the ending pressure within the accumulator volume. The initial pressure was a pre-set value greater than the ending pressure. The apparatus did not include a pressure transducer within the control volume, so it was assumed that the ending pressure within the control volume was substantially the same as that of the pressure of the molten polymer. The polymer melt pressure was monitored using a pressure transducer located in the molten polymer, adjacent to the injector valve outlet.

To introduce the dose of nitrogen, the inlet valve was closed and the outlet valve downstream of the accumulator was opened for one second. A single dose of nitrogen was introduced during the plastication period. The inlet valve of the accumulator was opened with a time delay of 0.3 seconds after the outlet valve of the accumulator was closed to confine an additional dose of nitrogen.

The process parameters during plastication were as follows:

| | |
|---|---|
| Circumferential Screw Speed | 6 in/sec |
| Specific back pressure on screw | 2700 psi |
| Polymer dosage stroke | 0.45 in |
| Inlet Valve Closing Position | 0.15 in |
| Average Temperature of Accumulator Volumes: | 200 F. |
| Cycle Time | ~18 seconds |

The polymer melt pressure at the location for nitrogen injection was measured to be 3050-3140 psi during screw recovery. The nitrogen pressure in the control volume was set to four different values.

Figure 6A:
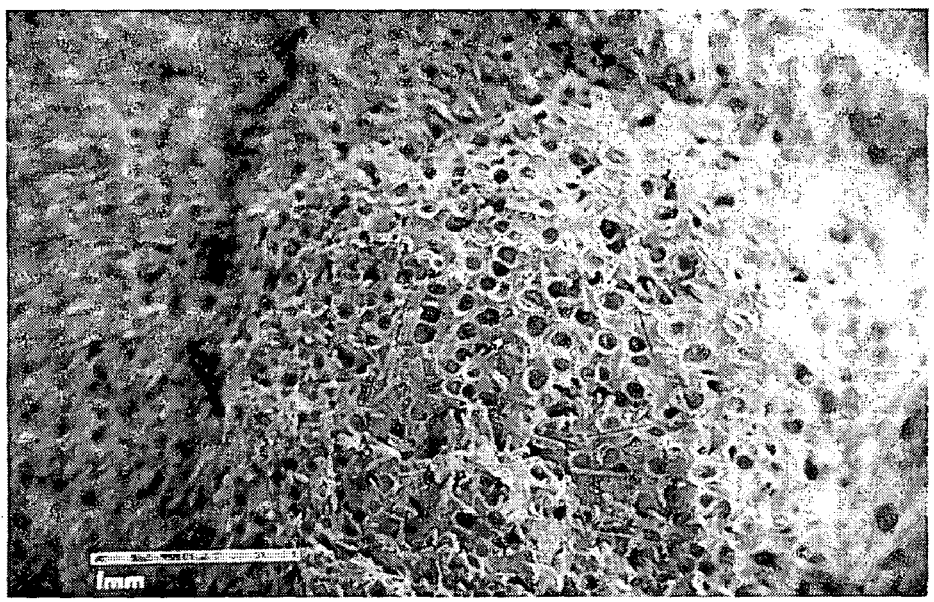
FIGS. 6A and 6B are copies of SEM photos that show representative cross-sections of parts produced in Example 3.
Figure 6B:
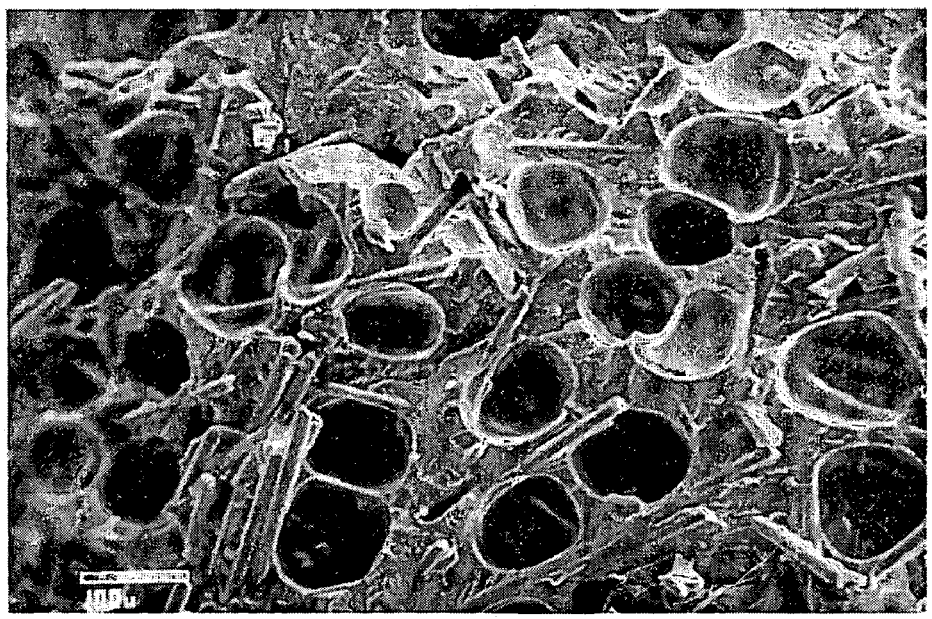

The first setting was calculated to deliver 9.3 mg (0.14% concentration by wgt) of Nitrogen at a accumulator pressure of 3300 psi. The system was adjusted and approximately 20 cycles were run prior to collecting parts. The system configuration remained unchanged for approximately one hour. High quality foam parts were produced. The parts had a density reduction of about 3.1% relative to the solid plastic. The parts had a closed cell structure with an average cell size of about 100 microns. FIGS. 6A and 6B are copies of SEM photos that show representative cross-sections of the parts.

Figure 7A:
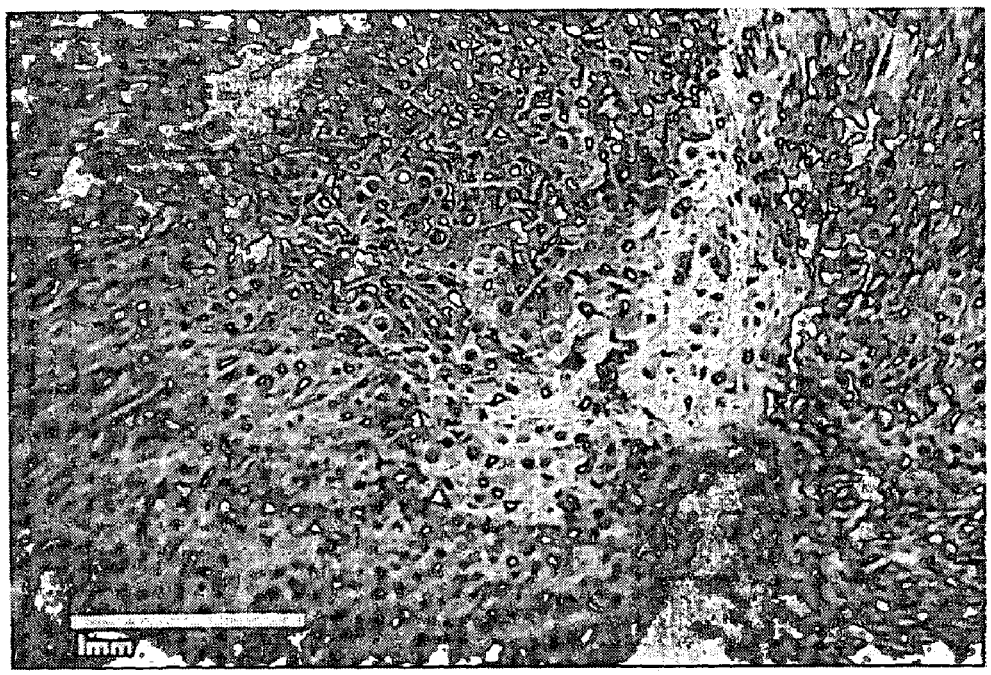
FIGS. 7A and 7B are copies of SEM photos that show representative cross-sections of parts produced in Example 3.
Figure 7B:

The second setting was calculated to deliver 13 mg (0.20% concentration by wgt) of Nitrogen at an accumulator pressure of 3400 psi. Again parts were collected for one hour and the process and parts were monitored. High quality parts were produced and the system configuration was stable. The parts had a density reduction of about 4.1% relative to the solid plastic. The parts had a closed cell structure with an average cell size of about 75 microns. FIGS. 7A and 7B are copies of SEM photos that show representative cross-sections of the parts.

Two other settings were tested. One was set to deliver 16.5 mg (0.25% concentration by weight) and the other 18.5 mg (0.28% concentration by weight) of Nitrogen with accumulator pressure settings of 3500 and 3600 psi, respectively. High quality parts were produced with the two additional settings and the system configurations were stable.

Figure 8A:
FIGS. 8A and 8B are copies of SEM photos that show representative cross-sections of parts produced in Example 3.
Figure 8B:
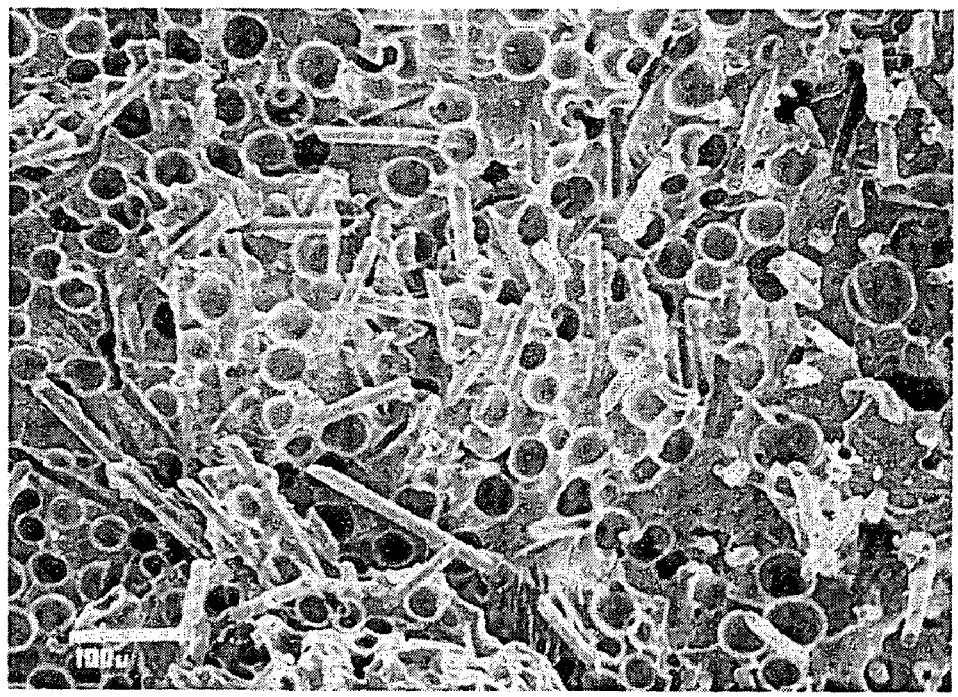

For the 18.5 mg of Nitrogen, the parts had a density reduction of about 5.3% relative to the solid plastic and a closed cell structure with an average cell size of about 40 microns. FIGS. 8A and 8B are copies of SEM photos that show representative cross-sections of the parts.

Those skilled in the art would readily appreciate that all parameters and configurations described herein are meant to be exemplary and that actual parameters and configurations will depend upon the specific application for which the systems and methods of the present invention are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described. The present invention is directed to each individual feature, system, or method described herein. In addition, any combination of two or more such features, systems or methods, if such features, systems or methods are not mutually inconsistent, is included within the scope of the present invention.

What is claimed is:

1. A blowing agent introduction system comprising:
an accumulator having an inlet connectable to a source of blowing agent and an outlet connectable to a blowing agent port of an extruder;
an inlet shut-off valve associated with the inlet of the accumulator, wherein the inlet shut-off valve has an open configuration that permits blowing agent flow therethrough and a closed configuration that prevents blowing agent flow therethrough;
a pressure regulating device designed to control the pressure of blowing agent delivered to the accumulator when the inlet shut-off valve is in the open configuration;
a pressure measuring device constructed and arranged to measure pressure of blowing agent in the accumulator;
an outlet shut-off valve associated with the outlet of the accumulator, wherein the outlet shut-off valve has an open configuration that permits blowing agent flow therethrough and a closed configuration that prevents blowing agent flow therethrough; and
a control system capable of receiving a first input signal from the pressure measuring device representative of the pressure of blowing agent in the accumulator and sending a first output signal to open the outlet shut-off valve to permit the introduction of blowing agent from the accumulator into polymeric material in the extruder.

2. The system of claim 1, wherein the outlet valve is positioned within less than about 1.0 inch from the blowing agent port.

3. The system of claim 1, wherein the control system sends the first output signal in response to a second input signal representative of an axial position of a screw in the extruder during plastication.

4. The system of claim 1, wherein the control system sends the first output signal in response to a third input signal representative of a time after the onset of screw rotation in the extruder.

5. The system of claim 1, wherein the control system is capable of sending a first output signal to open the outlet valve when the pressure of blowing agent in the accumulator is greater than pressure of polymeric material in the extruder in the vicinity of the blowing agent port.

6. The system of claim 5, wherein the control system sends the first output signal when pressure in the accumulator is greater than pressure of polymeric material in the extruder in the vicinity of the blowing agent port by at least about 200 psi.

7. The system of claim 1, wherein the volume of the accumulator is less than about 10 cubic centimeters.

8. The system of claim 1, further comprising a pressure measuring device that directly measures pressure of polymeric material in the extruder.

9. The system of claim 1, further comprising a pressure measuring device that indirectly measures pressure of polymeric material in the extruder.

10. The system of claim 1, further comprising a temperature measuring device associated with the accumulator, wherein the temperature measuring device sends signals to the control system representative of the temperature of the blowing agent in the accumulator.

11. The system of claim 1, wherein the accumulator has a substantially fixed volume.

12. The system of claim 1, further comprising a conduit connecting the source of blowing agent to the blowing agent port.

13. The system of claim 12, wherein the accumulator comprises a section of the conduit.

14. The system of claim 1, wherein the volume of the accumulator is less than about 1.0 cubic centimeters.

15. The system of claim 10, wherein the temperature measuring device sends signals to the controller representative of the temperature of the blowing agent in the accumulator.

* * * * *